(12) United States Patent
Isokawa et al.

(10) Patent No.: US 12,002,495 B2
(45) Date of Patent: Jun. 4, 2024

(54) MAGNETIC DISK DEVICE AND METHOD OF ADJUSTING PREHEAT TIME

(71) Applicants: Kabushiki Kaisha Toshiba, Tokyo (JP); Toshiba Electronic Devices & Storage Corporation, Tokyo (JP)

(72) Inventors: Hiroshi Isokawa, Yokohama Kanagawa (JP); Takuya Matsumoto, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/119,730

(22) Filed: Mar. 9, 2023

(65) Prior Publication Data

US 2024/0096349 A1 Mar. 21, 2024

(30) Foreign Application Priority Data

Sep. 21, 2022 (JP) ................................ 2022-150052

(51) Int. Cl.
*G11B 5/012* (2006.01)
*G11B 5/00* (2006.01)

(52) U.S. Cl.
CPC ........ *G11B 5/012* (2013.01); *G11B 2005/001* (2013.01); *G11B 2005/0021* (2013.01); *G11B 2209/02* (2013.01)

(58) Field of Classification Search
CPC .............. G11B 5/012; G11B 2005/001; G11B 2005/0021; G11B 2209/02
See application file for complete search history.

(56) References Cited

U.S. PATENT DOCUMENTS

| 7,995,425 B2 | 8/2011 | Schreck et al. |
| 8,456,980 B1 | 6/2013 | Thayamballi |
| 9,240,205 B1 * | 1/2016 | Gao .......................... G11B 5/02 |

* cited by examiner

*Primary Examiner* — Andrew Sasinowski
(74) *Attorney, Agent, or Firm* — Maier & Maier, PLLC

(57) ABSTRACT

According to one embodiment, a magnetic disk device includes magnetic disks, a plurality of magnetic heads, and a control unit. A plurality of magnetic heads each includes a heat-assist unit which applies a preheating current of such magnitude that data already written to the magnetic disk is not erased to a near-field optical element for the preheat time. The control unit measures the time elapsing from a start of write to the time when a value of an index indicating the quality of a recording signal of data written by the magnetic head converges to within a first threshold range, and adjusts the preheat time for each of the magnetic heads in such a manner that the measured lapse time becomes less than or equal to a second threshold.

4 Claims, 8 Drawing Sheets

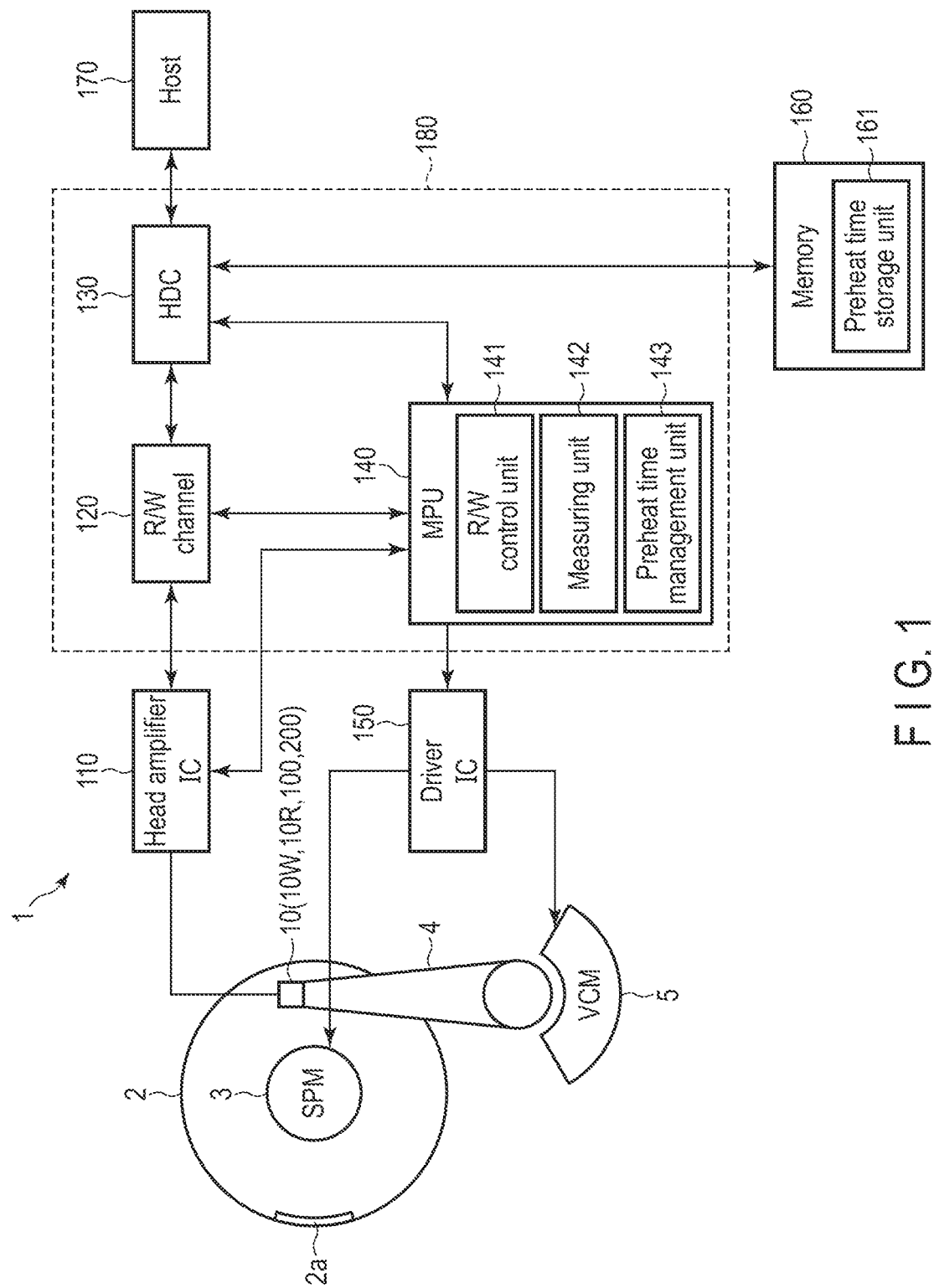
F I G. 1

| Head No. | Environmental temperature (Temp) | Preheat time |
|---|---|---|
| 1 | 0≤Temp<Temp1 | T1tm1 |
| | Temp1≤Temp<Temp2 | T1tm2 |
| | Temp2≤Temp<Temp3 | T1tm3 |
| | Temp3≤Temp | T1tm4 |
| ⋮ | ⋮ | ⋮ |
| N | 0≤Temp<Temp1 | TNtm1 |
| | Temp1≤Temp<Temp2 | TNtm2 |
| | Temp2≤Temp<Temp3 | TNtm3 |
| | Temp3≤Temp | TNtm4 |

TB2

| Head No. | Data recording radius (R) | Preheat time |
|---|---|---|
| 1 | 0≤R<R1 | T1r1 |
| | R1≤R<R2 | T1r2 |
| | R2≤R<R3 | T1r3 |
| | R3≤R | T1r4 |
| ⋮ | ⋮ | ⋮ |
| N | 0≤R<R1 | TNr1 |
| | R1≤R<R2 | TNr2 |
| | R2≤R<R3 | TNr3 |
| | R3≤R | TNr4 |

| Head No. | Medium rotational speed (S) | Preheat time |
|---|---|---|
| 1 | 0≤S<S1 | T1s1 |
| | S1≤S<S2 | T1s2 |
| | S2≤S<S3 | T1s3 |
| | S3≤S | T1s4 |
| ⋮ | ⋮ | ⋮ |
| N | 0≤S<S1 | TNs1 |
| | S1≤S<S2 | TNs2 |
| | S2≤S<S3 | TNs3 |
| | S3≤S | TNs4 |

TB4

MAGNETIC DISK DEVICE AND METHOD OF ADJUSTING PREHEAT TIME

CROSS-REFERENCE TO RELATED APPLICATIONS

This application is based upon and claims the benefit of priority from Japanese Patent Application No. 2022-150052, filed Sep. 21, 2022, the entire contents of which are incorporated herein by reference.

FIELD

Embodiments described herein relate generally to a magnetic disk device and method of adjusting preheat time.

BACKGROUND

A magnetic disk device including a magnetic head configured to heat-assist write of data is known. A magnetic disk device of this kind includes an element (hereinafter referred to as a near-field optical element) configured to irradiate the magnetic head with near-field light. As a light source of the near-field optical element, for example, a laser diode is used. The aforementioned magnetic head applies light from the laser diode to the near-field optical element to thereby cause the element emit near-field light from a tip end thereof and locally heat a recording layer of the magnetic disk having high perpendicular magnetic anisotropy. Thereby, in the heated portion of the recording layer, the coercive force is sufficiently lowered at the time of data write, and hence it becomes possible to realize high recording densification of the portion of the recording layer.

In such heat assisted magnetic recording (HAMR), when a current required for write is applied to the laser diode in synchronization with the start of data write, the variation in the signal quality such as bit error rate (BER) or signal to noise ratio (SNR) becomes significant at the early stage of data write. For this reason, stabilizing the signal quality at the early stage of data write by carrying out preheat of applying a current to the laser diode from the time before starting data write to such a degree that data already recorded on the magnetic disk is not erased and changing the value of the current to a desired current value at the timing of start-up of data write is contrived. At this time, the current value of the laser diode, i.e., the light output of the laser diode is adjusted according to each of, for example, a write data pattern, environmental temperature (ambient temperature of the magnetic disk device), mode hop, and the like.

However, the applied current versus light output characteristics of the laser diode mounted on each of the magnetic heads tend to become unstable at the early stage of current application. During the time when the light output is unstable, the signal quality of data write also tends to become unstable. The time during which the light output is unstable is the time from the start-up of data write to the stabilization of the light output, the time being required by the light output, and varies depending on the variation in the characteristics between the laser diodes. Accordingly, in order to suppress the variation in the signal quality at the early stage of data write and stabilize the signal quality sooner, it is required that preheating be appropriately carried out for each of the laser diodes of the magnetic heads.

An embodiment described herein aims to provide a magnetic disk device and method of adjusting preheat time capable of carrying out appropriate preheating for each of magnetic heads while taking the variation in the characteristics between the laser diodes of the magnetic heads into consideration.

BRIEF DESCRIPTION OF THE DRAWINGS

FIG. 1 is a block diagram showing an example of a control configuration of a magnetic disk device according to an embodiment.

DETAILED DESCRIPTION

Figure 2:
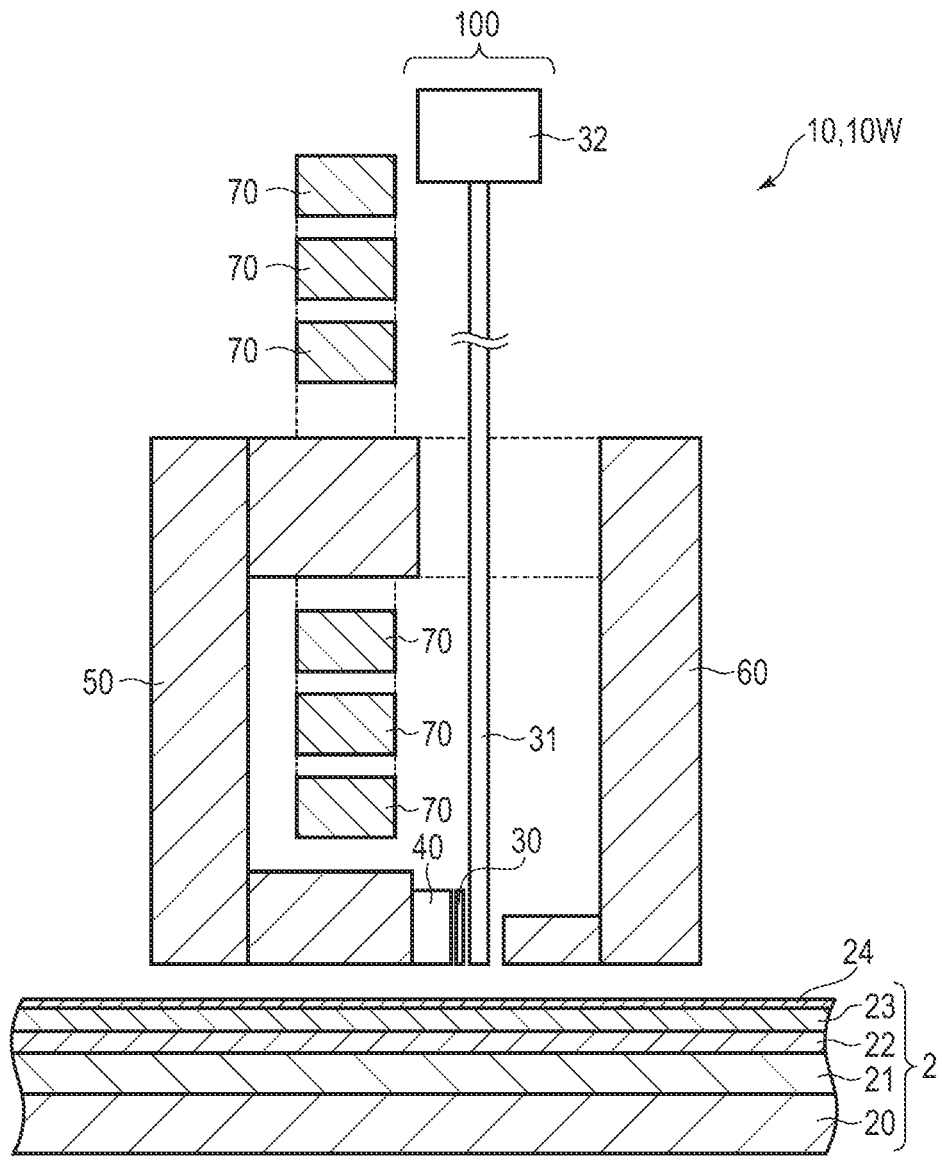
FIG. 2 is a view showing an example of a cross section of a write-head portion of a magnetic head including a heat-assist unit and magnetic disk according to the embodiment.

In general, according to one embodiment, a magnetic disk device comprises magnetic disks, a plurality of magnetic heads, and a control unit. Each of the plurality of magnetic heads includes a read head which reads data from the magnetic disk, a write head which writes data to the magnetic disk, and a heat-assist unit. The heat-assist unit applies a preheating current of such magnitude that data already written to the magnetic disk is not erased to a near-field optical element for the preheat time to thereby heat-assist the write head in writing data. The control unit measures the time elapsing from a start of write to the time when a value of an index indicating the quality of a recording signal of data written by the write head converges to within a first threshold range, and adjusts the preheat time for each of the magnetic heads in such a manner that the measured lapse time becomes less than or equal to a second threshold.

Embodiments will be described hereinafter with reference to the accompanying drawings. The disclosure is merely an example, and proper changes within the spirit of the invention, which are easily conceivable by a skilled person, are included in the scope of the invention as a matter of course.

In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

The control configuration of a magnetic disk device 1 according to an embodiment will be described below.

FIG. 1 is a block diagram showing an example of a control configuration of a magnetic disk device according to an embodiment. As shown in FIG. 1, the magnetic disk device 1 includes magnetic disks 2, spindle motor (SPM) 3, actuator assembly 4, voice coil motor (VCM) 5, and magnetic heads 10. On the magnetic disk 2, a management area 2a configured to record thereon information for managing recorded data is provided.

In this embodiment, the magnetic disk device 1 includes a plurality of magnetic disks 2. Each of the magnetic disks 2 includes, for example, a first surface in the rotational axis direction and second surface on the opposite side of the first surface and, both the surfaces are configured as data recording surfaces. In this case, the magnetic disk device 1 includes a plurality of magnetic heads 10 correspondingly to both the recording surfaces (first surface and second surface) of each of the plurality of magnetic disks 2. However, the number of the magnetic disk 2 may also be only one. In this case, the magnetic disk device 1 includes two magnetic heads 10 in such a manner that the two magnetic heads 10 each correspond to the recording surfaces (first surface and second surface) of the one magnetic disk 2.

The spindle motor 3 is driven by a drive current (or drive voltage) to be supplied thereto from a driver IC 150. A data pattern is recorded/reproduced on/from the magnetic disk 2 by the magnetic head 10.

The voice coil is operated by the voice coil motor 5 and actuator assembly 4 is concomitantly swung from an unload position of a ramp load mechanism an illustration of which is omitted, whereby the magnetic head 10 is moved to a position on a desired track of the magnetic disk 2 and is positioned to a predetermined position on the magnetic disk 2. The voice coil motor 5 is driven by a drive current (or drive voltage) to be supplied thereto from the driver IC 150 to be described later.

Furthermore, the magnetic disk device 1 includes a head amplifier IC 110, read/write (R/W) channel 120, hard disk controller (HDC) 130, microprocessor (MPU) 140, driver IC 150, and memory 160. Further, the magnetic disk device 1 is connectable to a host computer (host) 170. It should be noted that the R/W channel 120, HDC 130, and MPU 140 may also be configured as a system controller 180 into which the R/W channel 120, HDC 130, and MPU 140 are integrated.

The head amplifier IC 110 amplifies a read signal output from a read head 10R and transmits the amplified read signal to the R/W channel 120. Further, the head amplifier IC 110 supplies a write signal (write current corresponding to write data to be supplied thereto from the R/W channel 120 to a write head 10W. At this time, a control signal called a write gate (WG) is transmitted from the MPU 140 to the head amplifier IC 110 (write gate is put into an on-state) as a trigger for the start of data write. Furthermore, the head amplifier IC 110 controls the light output to be output from a heat-assist unit 100 (to be described later) of the magnetic head 10.

The R/W channel 120 is a signal processing circuit configured to process a signal relating to read/write. The R/W channel 120 includes a read channel configured to execute signal processing of read data and write channel configured to execute signal processing of write data. The read channel converts a read signal into digital data and decodes read data from the digital data. The write channel encodes write data to be transferred thereto from the HDC 130 and transfers the encoded write data to the head amplifier IC 110.

The HDC 130 controls write of data to the magnetic disk 2 and read of data from the magnetic disk 2 through the magnetic head 10, head amplifier IC 110, R/W channel 120, and MPU 140. The HDC 130 constitutes an interface between the magnetic disk device 1 and host 170 and executes transfer control of read data and write data. That is, the HDC 130 functions as a host interface controller configured to receive a signal to be transferred from the host 170 and transfer a signal to the host 170. Further, the HDC 130 receives a command (write command, read command or the like) to be transferred from the host 170 and transmits the received command to the MPU 140.

The MPU 140 is a main controller (control unit) of the magnetic disk device 1 and includes a read/write (R/W) control unit 141, measuring unit 142, and preheat time management unit 143. The MPU 140 executes processing of, for example, the R/W control unit 141, measuring unit 142, and preheat time management unit 143 on the firmware. Each of these units 141, 142, and 143 of the MPU 140 will be described later.

The driver IC 150 controls drive of the spindle motor 3 and voice coil motor 5 according to the control of the MPU 140. By driving the voice coil motor 5, the magnetic head 10 is positioned to a target track on the magnetic disk 2.

The memory 160 includes a volatile memory and nonvolatile memory. For example, the memory 160 includes a buffer memory constituted of a DRAM and flash memory. The flash memory of the memory 160 stores therein programs and parameters necessary for processing of the MPU 140 and includes a preheat time storage unit 161. The preheat time storage unit 161 stores therein preheat time (details thereof will be described later) adjusted for each of the magnetic heads 10.

The magnetic head 10 includes a write head 10W, read head 10R, heat-assist unit 100, and monitoring unit 200. The write head 10W writes data to the magnetic disk 2. The read head 10R reads data from the magnetic disk 2. The heat-assist unit 100 assists the write head 10W, when the write head 10W writes data to the magnetic disk 2, in writing the data. The monitoring unit 200 detects the light output of the heat-assist unit 100. The monitoring unit can have a configuration in which, for example, a light detector is incorporated in the magnetic head 10 or configuration in which a value detected by a bolometer incorporated in the magnetic head 10 is converted into light output.

As described above, the magnetic disk device 1 of this embodiment employs the heat assisted magnetic recording (HAMR) system and includes the magnetic heads 10 each of which includes the heat-assist unit 100. FIG. 2 is a view showing an example of a cross section of a write-head 10W portion of the magnetic head 10 including the heat-assist unit 100 and magnetic disk 2.

As shown in FIG. 2, the magnetic disk 2 is a recording medium in which, on a substrate 20 formed into a discoid shape and constituted of a non-magnetic material, a vertical recording layer 23, crystalline orientation layer 22, heat sink layer 21, and protective film 24 are stacked on top of each other in layers. The vertical recording layer 23 is a data recording layer arranged on the substrate 20 and has strong anisotropy (perpendicular magnetic anisotropy) in the direction perpendicular to the disk surface of the magnetic disk 2. The crystalline orientation layer 22 is arranged in the lower layer part of the vertical recording layer 23 and enhances the orientation of the vertical recording layer 23. The heat sink layer 21 is arranged in the lower layer part of the crystalline orientation layer 22 and suppresses expansion of the heated area. The protective film 24 is arranged on the upper side of the vertical recording layer 23 and protects the vertical recording layer 23.

In the example shown in FIG. 2, the magnetic head 10 is a separate type magnetic head in which the write head 10W and read head 10R are separate from each other. The write head 10W of the magnetic head 10 is configured to include, as main elements, a main pole 40, trailing yoke 50, return shield magnetic pole 60, coils 70, near-field optical element 30, and waveguide 31. The main pole 40 is constituted of a high magnetic permeability material and generates a magnetic field in the direction perpendicular to the magnetic disk surface. The trailing yoke 50 is magnetically joined to the main pole 40 and is configured to flow magnetic flux to the main pole 40. The return shield magnetic pole 60 is provided to efficiently close the magnetic path immediately beneath the main pole and arranged on the leading side of the main pole 40. The coils 70 are arranged in such a manner as to be wound around the magnetic path including the trailing yoke 50 and return shield magnetic pole 60 in order to make a magnetic flux flow through the main pole 40. The near-field optical element 30 generates near-field light configured to heat the recording layer of the recording medium on the leading side of the main pole 40. The waveguide 31 propagates light configured to generate near-field light through itself.

In the heat-assist unit 100, the laser diode 32 serving as the light source of the near-field optical element 30 is incorporated in such a form that the laser diode 32 is mounted on the slider. The near-field optical element 30 is constituted of one of, for example, Au, Pd, Pt, Rh, and Ir or an alloy constituted of a combination of some of the aforementioned metals. It is desirable that the insulating layer intervening between the main pole 40 and near-field optical element 30 be an oxide constituted of, for example, $SiO_2$, $Al_2O_3$ or the like.

By applying light from the laser diode 32 to the near-field optical element 30, the magnetic head 10 including the aforementioned heat-assist unit 100 causes the near-field optical element 30 to generate near-field light from the tip end thereof to thereby locally heat the vertical recording layer 23. At the heated part of the vertical recording layer 23, the coercive force is sufficiently lowered at the time of data write, and hence high recording densification of the aforementioned part of the vertical recording layer 23 is realized.

The magnetic disk device 1 configured as described above is operation-controlled by the MPU 140. As shown in FIG. 1, the MPU 140 includes the R/W control unit 141, measuring unit 142, and preheat time management unit 143. Hereinafter the R/W control unit 141, measuring unit 142, and preheat time management unit 143 will be described.

The R/W control unit 141 controls read processing and write processing of data according to a command from the host 170. At this time, the R/W control unit 141 controls the VCM 5 through the driver IC 150, positions (seeking) the magnetic head 10 to a target position on the magnetic disk 2, and controls read of data from the magnetic disk 2 or write of data to the magnetic disk 2. Further, the R/W control unit 141 controls the heat-assist unit 100 of the magnetic head 10 and controls the light output of the laser diode 32 through the head amplifier IC 110. The light output is the output of the preheating current or operation current to be applied to the laser diode 32. The preheating current is a current of such magnitude that data already written to the magnetic disk 2 is not erased. The operation current is a current to be applied to the laser diode 32 at the time when data is written to the magnetic disk 2 by the magnetic head 10 in order to cause the near-field optical element 30 to generate near-field light.

The measuring unit 142 measures an index (hereinafter referred to as an evaluation index) indicating the quality of the recording signal of data written by the write head 10W after an elapse of the preheat time. The measuring unit 142 evaluates the quality of the recording signal of data on the basis of the measured evaluation index. The preheat time is the time for which the preheating current is applied to the near-field optical element 30, more specifically, to the laser diode 32. The preheat time corresponds to the time from the time when the preheating current is applied to the laser diode 32 to the time when write of data is started. The evaluation index is, for example, On Track BER, Fringe BER, SNR, Over Write (OW), and the like. By using these evaluation indices, it is possible to evaluate the quality of the recording signal of write data. The On Track BER is a BER on a track to which data is written. The Fringe BER is a BER of a center track in a state where data is first written thereto, and thereafter data is written to adjacent tracks on both sides, the center track being the center track after the data is written to the adjacent tracks. The SNR is a ratio between the normal signal and noise on a track to which data is written. The OW is a property by which a signal written on the base is erased or written, and is an index based on a combination of the magnetic disk 2 and magnetic head 10.

Further, the measuring unit 142 measures the length of time (hereinafter referred to as instability time) from the time when the operation current is applied to the near-field optical element 30 to the time when the evaluation index converges to within a first threshold range, the length of time being required for the evaluation index to converge. That is, the instability time is the time elapsing from the time when data write is started by the magnetic head 10 (write head 10W) after an elapse of the preheat time to the time when the evaluation index converges to within the first threshold range. In the instability time, the state where the evaluation index is outside the first threshold range is included. Converging of the evaluation index to within the first threshold range implies the state where the evaluation index stays within the first threshold range for the predetermined time without the state where the evaluation index is outside the first threshold range being included in the aforementioned state. The first threshold range is the range which is specified by the lower limit (first lower limit) of the evaluation index and upper limit (first upper limit) thereof, and which is the range of a value that can be taken by the evaluation index, and is the optimum range of the value of the evaluation index. The first lower limit and first upper limit are each set as, for example, a width of deviation relative to the reference value (optimum value) of the evaluation index. The first lower limit and first upper limit are retained in the nonvolatile memory of the memory 160 and are read by the measuring unit 142 as parameters at the time when the preheat time management processing to be described later is executed.

The preheat time management unit 143 adjusts the preheat time in such a manner that the instability time measured by the measuring unit 142 becomes less than or equal to a second threshold. The second threshold is the permissible upper limit (second upper limit) of the instability time.

Although it is sufficient if the second threshold is a fixed value, the second threshold may also be a value of a variable. It should be noted that the second threshold is retained in the nonvolatile memory of the memory 160 and is read by the measuring unit 142 as a parameter at the time when the preheat time management processing to be described later is executed. In this embodiment, the preheat time management unit 143 adjusts the preheat time of the laser diode 32 of the magnetic head 10 for each of the plurality of magnetic heads 10. The adjusted preheat time is stored in the preheat time storage unit 161 of the memory 160. Regarding the stored preheat time, at the time of write processing of data to be described later, the set value thereof corresponding to the magnetic head 10 configured to write the aforementioned data is read by the R/W control unit 141. The R/W control unit 141 acquires the set value of the preheat time read by itself as a parameter to be used at the time of write processing carried out by the aforementioned magnetic head 10. The R/W control unit 141 applies the preheating current to the laser diode 32 of the magnetic head 10 for the acquired preheat time, i.e., the preheat time adjusted in such a manner that the instability time becomes less than or equal to the second threshold and, thereafter writes data to the magnetic disk 2 by the aforementioned magnetic head 10.

The preheat time adjusted by the preheat time management unit 143 is retained as a record for, for example, each of the laser diodes 32 of the near-field optical elements 30, i.e., for each of the magnetic heads 10. The created records are accumulated up to the number corresponding to all the magnetic heads 10 (laser diodes 32 of the near-field optical elements 30) and are tabulated. The aforementioned table (hereinafter referred to as a preheat time table) is retained in the preheat time storage unit 161 so as to be readable. It should be noted that before the preheat time management processing to be described later is executed, an initial value of the preheat time is set for each of the magnetic heads 10 in the preheat time table.

Figure 3:
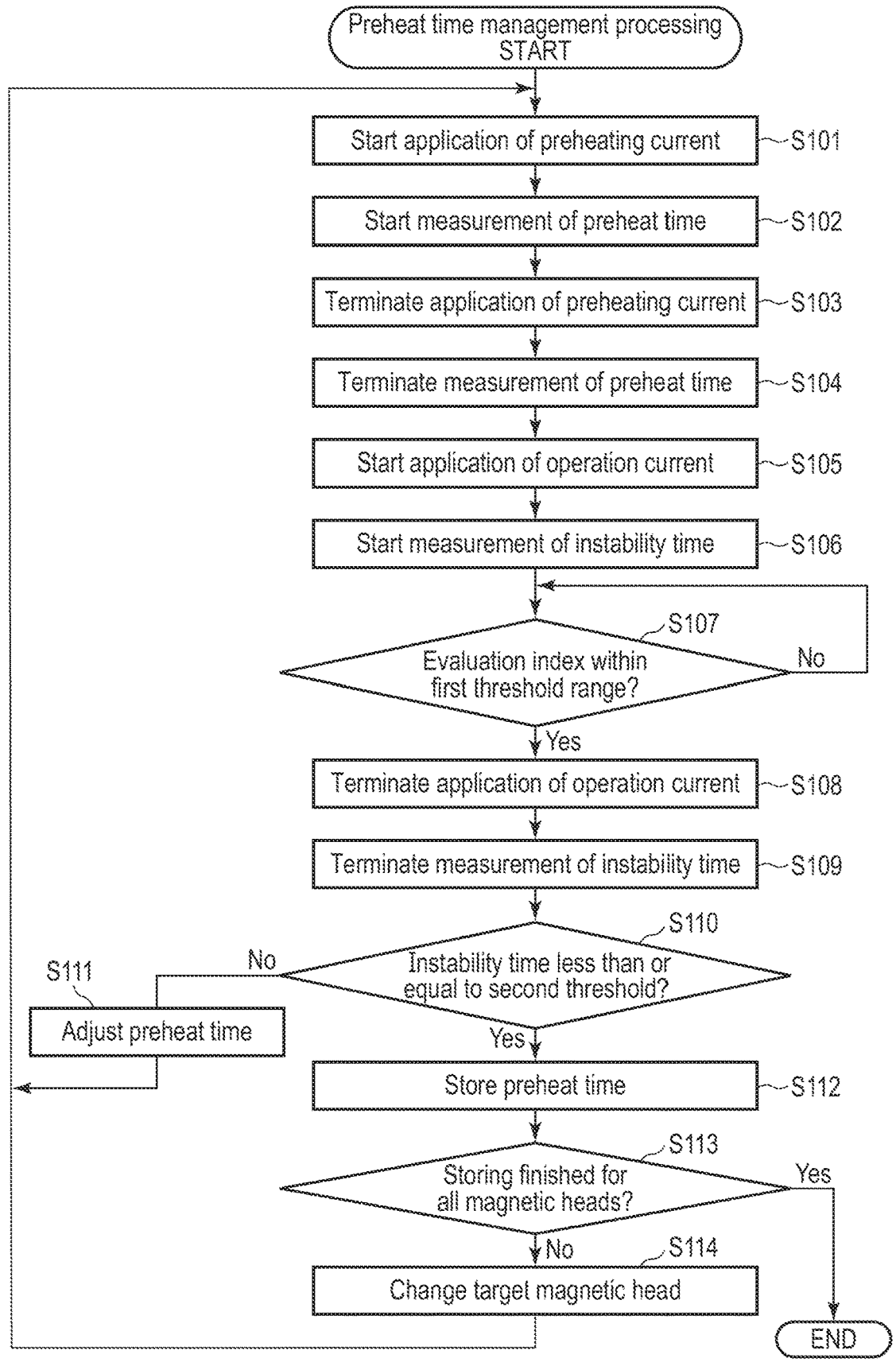
FIG. 3 is a flowchart of preheat time management processing in the magnetic disk device according to the embodiment.

The processing for adjusting the preheat time and creating a preheat time table according to the adjusted preheat time (hereinafter referred to as preheat time management processing) is executed by the MPU 140 at the inspection stage before shipment of the magnetic disk device 1. FIG. 3 is a flowchart of control to be executed by the MPU 140 (R/W control unit 141, measuring unit 142, and preheat time management unit 143) in the preheat time management processing. Hereinafter, the control to be executed by the MPU 140 at the time of the preheat time management processing in the magnetic disk device 1 will be described according to the flowchart shown in FIG. 3.

As shown in FIG. 3, when carrying out the preheat time management processing, the R/W control unit 141 starts application of a preheating current to the predetermined magnetic head 10 (referred to as a target magnetic head in the description of the preheat time management processing) intended to write data to the magnetic disk 2 (S101). When application of the preheating current is started, the measuring unit 142 starts measurement of the preheat time (S102).

After an elapse of the predetermined preheat time, i.e., here, the time set as the initial value of the preheat time, the R/W control unit 141 terminates application of the preheating current to the target magnetic head (S103). When application of the preheating current is terminated, the measuring unit 142 terminates measurement of the preheat time (S104).

When application of the preheating current is terminated and measurement of the preheat time is terminated, the R/W control unit 141 starts application of an operation current to the target magnetic head (S105). Thereby, write of data to the magnetic disk 2 by the target magnetic head is started. When application of the operation current is started, the measuring unit 142 starts measurement of the instability time (S106).

When measurement of the instability time is started, the measuring unit 142 determines whether or not the evaluation index has converged to within the first range (S107). That is, the measuring unit 142 evaluates the quality of the recording signal of data on the basis of the evaluation index. When making the determination, the measuring unit 142 measures the evaluation index and compares the value of the measured evaluation index with the first lower limit and first upper limit. For example, when the state where the value of the measured evaluation index is a value within the range greater than or equal to the first lower limit and less than the first upper limit continues until termination of write, the measuring unit 142 determines that the evaluation index has converged to within the first range. On the other hand, when the value of the measured evaluation index is less than the first lower limit or is greater than or equal to the first upper limit, the measuring unit 142 determines that the evaluation index has not converged to within the first range (outside the first range).

The measuring unit 142 repeats the aforementioned determination until the measuring unit 142 determines that the evaluation index has converged to within the first range (No in S107).

Conversely, when it is determined that the evaluation index has converged to within the first range (Yes in S107), the R/W control unit 141 terminates application of the operation current to the target magnetic head (S108). Thereby, write of data to the magnetic disk 2 by the target magnetic head is terminated. When application of the operation current is terminated, the measuring unit 142 terminates measurement of the instability time (S109).

When measurement of the instability time is terminated, the measuring unit 142 determines whether or not the instability time is less than or equal to the second threshold (S110). When making the determination, the measuring unit 142 compares the value of the measured instability time with the second threshold.

When it is determined that the instability time exceeds the second threshold, the preheat time management unit 143 adjusts the preheat time (S111). In making an adjustment, the preheat time management unit 143 shortens or prolongs the preheat time to less than or greater than the current value in such a manner that the instability time becomes less than or equal to the second threshold. Thereby, the value of the preheat time is set to a value less than or a value greater than the current value.

When the preheat time is adjusted, the R/W control unit 141 applies the preheating current to the target magnetic head for the adjusted preheat time (S101 to S104). Thereafter, control from S105 to S109 is selectively carried out.

Conversely, when it is determined that the instability time is less than or equal to the second threshold (Yes in S110), the preheat time management unit 143 stores the preheat time in the preheat time table of the preheat time storage unit 161 (S112). The value of the preheat time to be stored in this case is the current value and, when the value is not a value obtained by adjusting the initial value, is the initial value and, when the value is a value obtained by adjusting the initial value, is the value after adjustment. In either case, according to the preheating for the stored preheat time, the instability time at the time of data write by the target head becomes less than or equal to the second threshold.

Until the preheat time for each of all the magnetic head 10 of the magnetic disk device 1 is stored in the preheat time table, the MPU 140 selectively repeats the processing from S101 to S112 (S113). Accordingly, when a magnetic head 10 the current value of the preheat time of which is not yet stored in the preheat time table is present (No in S113), the preheat time management unit 143 changes the target magnetic head to the aforementioned magnetic head 10 (S114). For example, the preheat time management unit 143 makes a magnetic head 10 having a logical head number next to the current target head the new target magnetic head.

Then, the R/W control unit 141 applies the preheating current to the new target magnetic head for the preheat time (value of the initial value in this case) (S101 to S104). Thereafter, the control from S105 to S112 is appropriately executed and preheat time for the new target magnetic head is stored in the preheat time table.

Conversely, when a magnetic head 10 the current value of the preheat time of which is not yet stored in the preheat time table is not present (Yes in S113), the preheat time management unit 143 terminates the preheat time management processing. That is, in this case, the current state is the state where the current value of the preheat time is already stored in the preheat time table with respect to each of all the magnetic heads 10, and hence the preheat time management processing is terminated.

Figure 4:
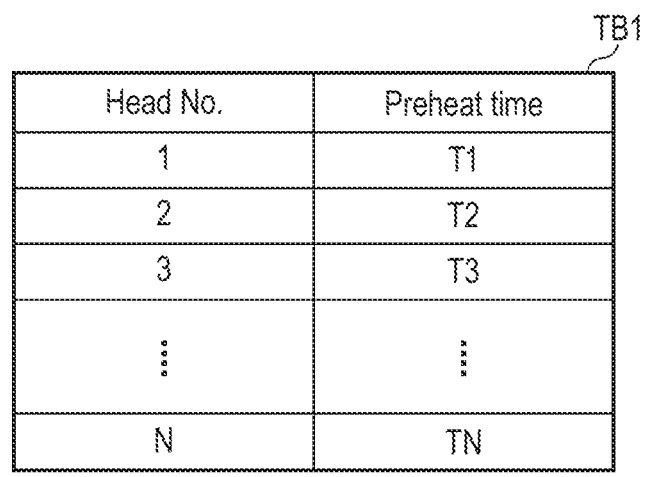
FIG. 4 is a view schematically showing a preheat time table in the magnetic disk device according to the embodiment.

FIG. 4 is a view schematically showing a preheat time table TB1 created by the preheat time management processing. In the example shown in FIG. 4, "Head No" indicates the logical head number of the magnetic head 10, and "preheat time" indicates the value of the preheat time set for the magnetic head 10 of the aforementioned logical head number. As described above, the preheat time of the laser diode 32 of the aforementioned magnetic head 10 is set for each of the plurality of magnetic heads 10. For example, the preheat time of the magnetic head 10 the logical head number of which is 1 is set to T1, preheat time of the magnetic head 10 the logical head number of which is 2 is set to T2, preheat time of the magnetic head 10 the logical head number of which is 3 is set to T3, and preheat time of the magnetic head 10 the logical head number of which is N is set to TN. Here, N is the number of the magnetic heads 10 possessed by the magnetic disk device 1, and is an arbitrary natural number.

The preheat time set for each of the magnetic heads 10 may further be subdivided into a plurality of fractions and adjusted for each of the magnetic heads 10, i.e., for each and every one of the magnetic heads 10. The item to be made the reference for subdivision is arbitrarily selectable. For example, as the reference item for subdivision, environmental temperature, data recording radius, medium rotational speed, and the like are applicable. The environmental temperature is the ambient temperature of the magnetic disk device 1. The data recording radius is the position to which data is written on the magnetic disk 2 in the radial direction on the magnetic disk 2, and the radial position thereof on the magnetic disk 2 is specified by the distance from the rotational center of the magnetic disk 2 in the radial direction. The medium rotational speed is the rotational speed of the magnetic disk 2, e.g., the number of revolutions per minute. Although it is sufficient if the plurality of fractions of the preheat time into which the preheat time is subdivided, and which are then adjusted for one magnetic head 10 each have values different from each other, part of or all of the fractions may be adjusted to one and the same value.

Figures 5, 6:
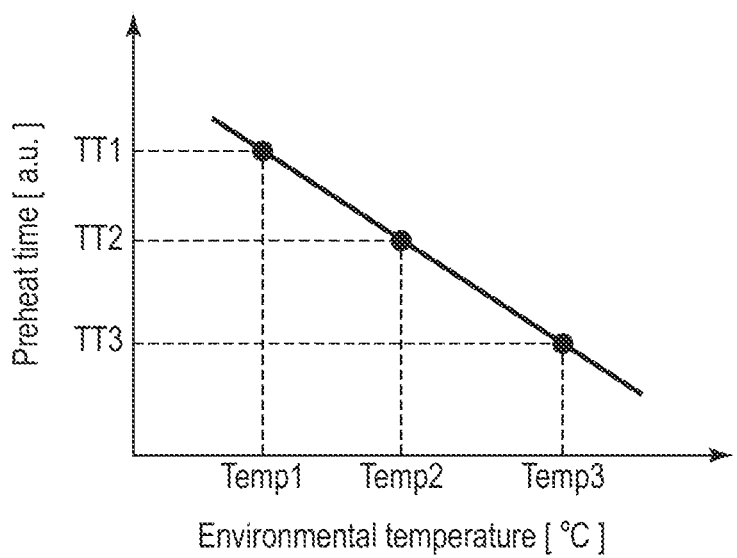
FIG. 5 is view showing a relationship between the environmental temperature and preheat time.
FIG. 6 is a view schematically showing a preheat time table in which the preheat time is subdivided into a plurality of fractions according to the environmental temperature, and the plurality of preheat time fractions are set for each of the magnetic heads.

FIG. 5 is view showing a relationship between the environmental temperature and preheat time. FIG. 6 is a view schematically showing a preheat time table TB2 in which the preheat time is subdivided into a plurality of fractions according to the environmental temperature, and the plurality of preheat time fractions are set for each of the magnetic heads. As shown in FIG. 5, as the environmental temperature [° C.] gradually rises to Temp1, Temp2, and Temp3, the preheat time [a.u.] gradually becomes shorter as short as TT1, TT2, and TT3. That is, in the relationship between the environmental temperature and preheat time, there is a tendency that the higher the environmental temperature, the shorter the sufficient preheat time can be made. In the preheat time table TB2 shown in FIG. 6, "Head No" indicates the logical head number of the magnetic head 10, "environmental temperature" indicates the range of the environmental temperature (Temp), and "preheat time" indicates the value of the preheat time set for the aforementioned range of the environmental temperature.

For example, the preheat time of the magnetic head 10 the logical head number of which is 1 is subdivided according to the environmental temperature in the following manner. When the environmental temperature (Temp) is higher than or equal to 0 and lower than Temp1, the preheat time is set to T1$tm$1. When the environmental temperature is higher than or equal to Temp1 and lower than Temp2, the preheat time is set to T1$tm$2. When the environmental temperature is higher than or equal to Temp2 and lower than Temp3, the preheat time is set to T1$tm$3. When the environmental temperature is higher than or equal to Temp3, the preheat time is set to T1$tm$4.

Thereafter, up to the logical head number of N, the preheat time of each of the magnetic heads 10 is subdivided according to the environmental temperature. The preheat time of the magnetic head 10 the logical head number of which is N is, when the environmental temperature (Temp) is higher than or equal to 0 and lower than Temp1, set to TNtm1, when the environmental temperature is higher than or equal to Temp1 and lower than Temp2, set to TNtm2, when the environmental temperature is higher than or equal to Temp2 and lower than Temp3, set to TNtm3 and, when the environmental temperature is higher than or equal to Temp3, set to TNtm4.

The magnetic disk device 1 operates in general at temperatures from 5 [° C.] to 60 [° C.], and hence it is sufficient if the environmental temperature (Temp) is also made to vary within the range of such an extent. Although in the examples shown in FIG. 5 and FIG. 6, the number of borders between the environmental temperature fractions all of which are within the aforementioned range is made three, the number of borders may also be less than or equal to two or more than or equal to four.

Figures 7, 8:
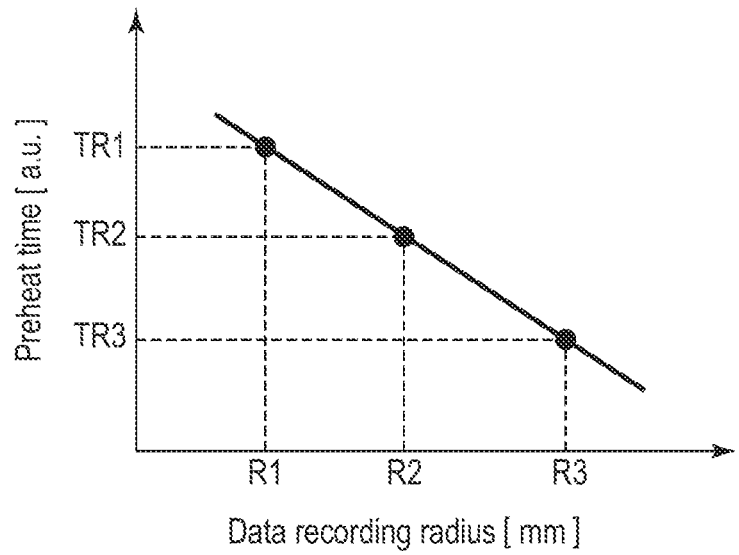
FIG. 7 is a view showing a relationship between the data recording radius and preheat time.
FIG. 8 is a view schematically showing a preheat time table in which the preheat time is subdivided into a plurality of fractions according to the data recording radius, and the plurality of preheat time fractions are set for each of the magnetic heads.

FIG. 7 is a view showing a relationship between the data recording radius and preheat time. FIG. 8 is a view schematically showing a preheat time table TB3 in which the preheat time is subdivided into a plurality of fractions according to the data recording radius, and the plurality of preheat time fractions are set for each of the magnetic heads 10. As shown in FIG. 7, as the data recording radius [mm] gradually becomes larger as large as R1, R2, and R3, the preheat time [a.u.] gradually becomes shorter as short as TR1, TR2, and TR3. That is, in the relationship between the data recording radius and preheat time, there is a tendency that the larger the data recording radius, the shorter the sufficient preheat time can be made. In the preheat time table TB3 shown in FIG. 8, "Head No" indicates the logical head number of the magnetic head 10, "data recording radius (R)" indicates the range of the data recording radius, and "preheat time" indicates the value of the preheat time set for the aforementioned range of the data recording radius.

For example, the preheat time of the magnetic head 10 the logical head number of which is 1 is subdivided according to the data recording radius in the following manner. When the data recording radius (R) is larger than or equal to 0 and smaller than R1, the preheat time is set to T1$r$1. When the data recording radius is larger than or equal to R1 and smaller than R2, the preheat time is set to T1$r$2. When the data recording radius is larger than or equal to R2 and smaller than R3, the preheat time is set to T1$r$3. When the data recording radius is larger than or equal to R3, the preheat time is set to T1$r$4.

Thereafter, up to the logical head number of N, the preheat time of each of the magnetic heads 10 is subdivided according to the data recording radius. The preheat time of the magnetic head 10 the logical head number of which is N is, when the data recording radius (R) is larger than or equal to 0 and smaller than R1, set to TNr1, when the data recording radius is larger than or equal to R1 and smaller than R2, set to TNr2, when the data recording radius is larger than or equal to R2 and smaller than R3, set to TNr3 and, when the data recording radius is larger than or equal to R3, set to TNr4.

In the magnetic disk 2 of the magnetic disk device 1, the recording frequency and linear speed differ according to the data recording radius. The linear speed is the speed of the track on which data is recorded in the circumferential direction and is the speed of the magnetic disk 2 relative to the magnetic head 10. For this reason, the variation aspect (mode) of the evaluation index also differs according to the data recording radius. Therefore, by subdividing the preheat time according to the data recording radius, it is possible to set the preheat time more appropriately. Although in the examples shown in FIG. 7 and FIG. 8, the number of borders between the data recording radii is made three, the number of borders may also be less than or equal to two or more than or equal to four.

Figures 9, 10:
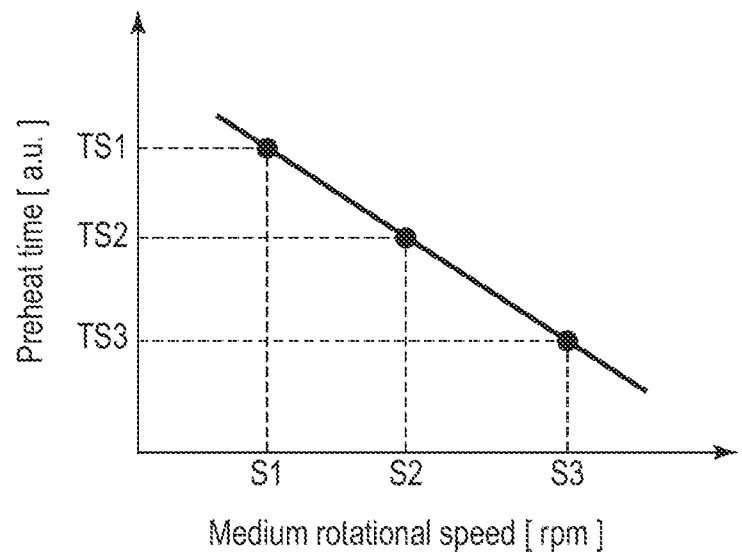
FIG. 9 is a view showing a relationship between the medium rotational speed and preheat time.
FIG. 10 is a view schematically showing a preheat time table in which the preheat time is subdivided into a plurality of fractions according to the medium rotational speed, and the plurality of preheat time fractions are set for each of the magnetic heads.

FIG. 9 is a view showing a relationship between the medium rotational speed and preheat time. FIG. 10 is a view schematically showing a preheat time table TB4 in which the preheat time is subdivided into a plurality of fractions according to the medium rotational speed, and the plurality of preheat time fractions are set for each of the magnetic heads 10. As shown in FIG. 9, as the medium rotational speed [rpm] gradually becomes higher as high as S1, S2, and S3, the preheat time [a.u.] gradually becomes shorter as short as TS1, TS2, and TS3. That is, in the relationship between the medium rotational speed and preheat time, there is a tendency that the higher the medium rotational speed, the shorter the sufficient preheat time can be made. In the preheat time table TB4 shown in FIG. 10, "Head No" indicates the logical head number of the magnetic head 10, "medium rotational speed (S)" indicates the range of the medium rotational speed, and "preheat time" indicates the value of the preheat time set for the aforementioned range of the medium rotational speed.

For example, the preheat time of the magnetic head 10 the logical head number of which is 1 is subdivided according to the medium rotational speed in the following manner. When the medium rotational speed (rpm) is higher than or equal to 0 and lower than S1, the preheat time is set to T1$s$1. When the medium rotational speed is higher than or equal to S1 and lower than S2, the preheat time is set to T1$s$2. When the medium rotational speed is higher than or equal to S2 and lower than S3, the preheat time is set to T1$s$3. When the medium rotational speed is higher than or equal to S3, the preheat time is set to T1$s$4.

Thereafter, up to the logical head number of N, the preheat time of each of the magnetic heads 10 is subdivided according to the medium rotational speed. The preheat time of the magnetic head 10 the logical head number of which is N is, when the medium rotational speed (rpm) is higher than or equal to 0 and lower than S1, set to TNs1, when the medium rotational speed is higher than or equal to S1 and lower than S2, set to TNs2, when the medium rotational speed is higher than or equal to S2 and lower than S3, set to TNs3 and, when the medium rotational speed is higher than or equal to S3, set to TNs4.

In the magnetic disk 2 of the magnetic disk device 1, the recording frequency and linear speed differ according to the medium rotational speed. For this reason, the variation aspect (mode) of the evaluation index also differs according to the medium rotational speed. Further, for example, the higher the linear speed, the larger becomes the preheating current to be applied to the laser diode 32 at the time when preheating is to be carried out. Therefore, by subdividing the preheat time according to the medium rotational speed, it is possible to set the preheat time more appropriately. Although in the examples shown in FIG. 9 and FIG. 10, the number of borders between the medium rotational speeds is made three, the number of borders may also be less than or equal to two or more than or equal to four.

As described above, according to this embodiment, it is possible to appropriately adjust the preheat time of the laser diode 32 of the magnetic head 10 for each of the plurality of magnetic heads 10. The aforementioned preheat time is adjusted in such a manner that the instability time of the evaluation index of the signal quality at the time of data write is shortened to less than or equal to the second threshold, i.e., the instability time is shorted to within the allowable range of the instability time.

For example, when the preheat time of each of the laser diodes 32 is equally adjusted according to each of the write data pattern, environmental temperature (ambient temperature of the magnetic disk device), mode hop, and the like, it is not possible to control the variation in the instability time due to the unevenness of the characteristics of the laser diodes 32. Conversely, according to this embodiment, it is possible to adjust the preheat time for each of the magnetic heads 10 including the laser diodes 32 while taking the characteristic variation between the laser diodes 32 of the magnetic heads 10 into consideration. Accordingly, regardless of the individual characteristic variations of the laser diodes 32, it is possible to carry out appropriate preheating for each of the magnetic heads 10.

Accordingly, after applying the preheating current to the laser diode 32 of each of the magnetic heads 10 for the aforementioned preheat time, by writing data to the magnetic disk 2 by means of the aforementioned magnetic head 10, it is possible to shorten the instability time at the time of data write using any one of the magnetic heads 10. Thereby, it is possible to write data in the state where, after starting of write of data by each of the magnetic heads 10, the evaluation index of the signal quality promptly converges to within the first threshold range, i.e., in the state where the evaluation index is within the optimum range. As a result, it becomes possible to keep the quality of the recording signal at the time of data write constant, and it is possible to realize improvement in the reliability of the recording signal.

Figure 11:
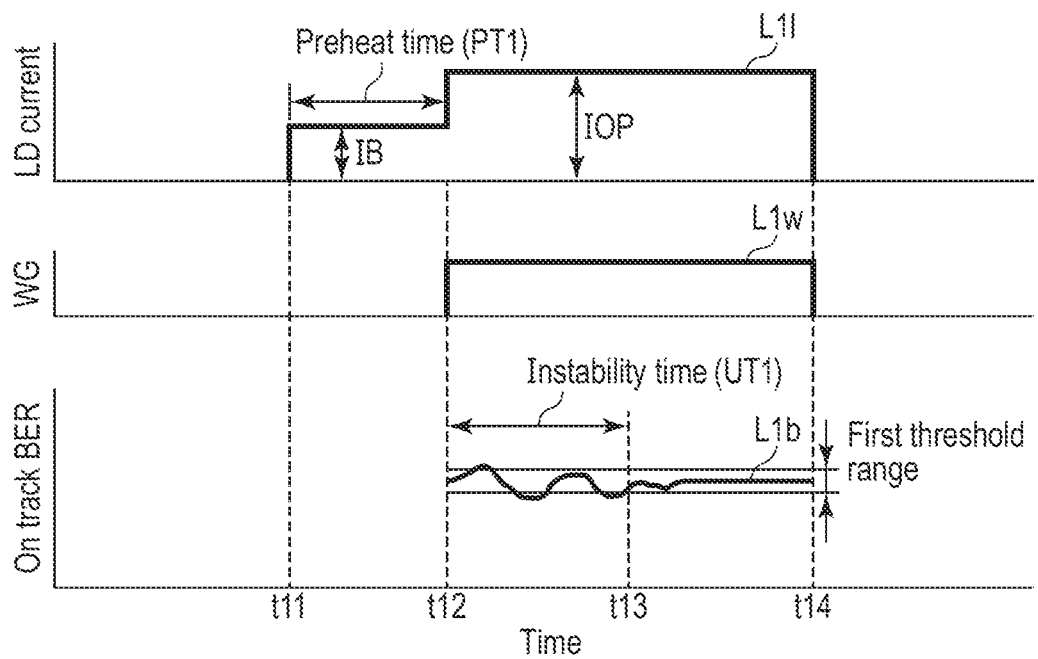
FIG. 11 is a time chart at the time of data write in a comparative example.
Figure 12:
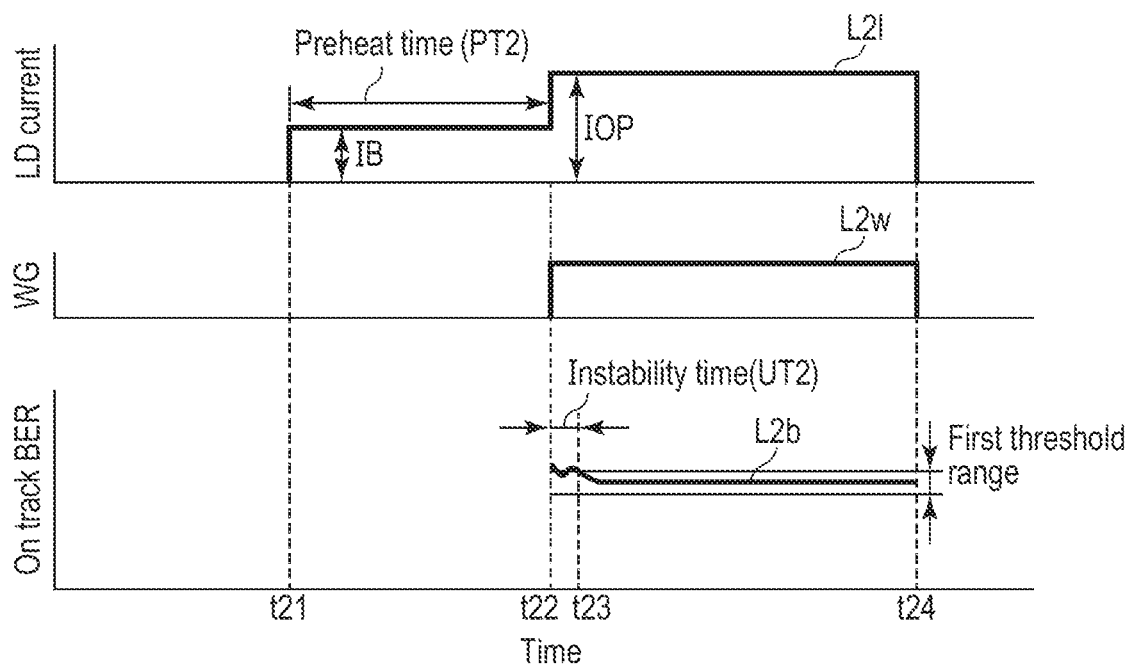
FIG. 12 is a time chart at the time of data write in the embodiment.

In FIG. 11 and FIG. 12, the aspects in which improvement in the reliability of the recording signal at the time of data write is realized as described above are shown by the time charts at the time of write of the same data. FIG. 11 is the time chart at the time of data write in the comparative example. In the comparative example, the preheat time is the initial value. FIG. 12 is a time chart at the time of data write in this embodiment. In this embodiment, the preheat time is an adjusted value of the initial value.

First, the operation at the time of data write in the comparative example will be described below with reference to FIG. 11. In FIG. 11, the solid line L1b is a locus indicating the temporal fluctuation in the evaluation index (in this case, On Track BER), solid line L1w is a locus indicating the temporal fluctuation in the write gate (WG), and solid line L1l is a locus indicating the temporal fluctuation in the current (LD current) to be applied to the laser diode. As shown in FIG. 11, at the predetermined time t11, an LD current (preheating current) of a current value IB is applied to the laser diode 32. The preheating current is applied for the preheat time PT1 and, when the time t12 is reached, the control signal (write gate (WG)) is made on as a write starting trigger. Simultaneously with this, an LD current (operation current) of the current value IOP is applied to the laser diode 32. Thereby, write of data is started.

The time from the start of data write at the time t12 to the time t13 is the instability time UT1 and the state where the evaluation index of the signal quality is outside the first threshold range is included in the instability time UT1. The first threshold range in this case is the slice width within which the fluctuating On Track BER is made optimum. After the elapse of the instability time UT1, i.e., after the time t13, the state where the evaluation index of the signal quality converges to within the first threshold range so as to be stable is obtained. Then, at the time t14, the write gate (WG) is made off and application of the operation current to the laser diode 32 is stopped. Thereby, write of data is terminated.

Next, the operation in this embodiment at the time of write of the data identical to the comparative example will be described below with reference to FIG. 12. In FIG. 12, the solid line L2b is a locus indicating the temporal fluctuation in the evaluation index (in this case, On Track BER), solid line L2w is a locus indicating the temporal fluctuation in the write gate (WG), and solid line L2l is a locus indicating the temporal fluctuation in the current (LD current) to be applied to the laser diode. As shown in FIG. 12, at the predetermined time t21, the preheating current of the current value IB is applied to the laser diode 32. The preheating current is applied for the preheat time PT2 and, when the time t22 is reached, the control signal (write gate (WG)) is made on as a write starting trigger. Simultaneously with this, the operation current of the current value IOP is applied to the laser diode 32. Thereby, write of data is started.

The time from the start of data write at the time t22 to time t23 is the instability time UT2 and the state where the evaluation index of the signal quality is outside the first threshold range is included in the instability time UT2. As in the case of the comparative example, the first threshold range in this case is the slice width within which the fluctuating On Track BER is made optimum. After the elapse of the instability time UT2, i.e., after the time t23, the state where the evaluation index of the signal quality converges to within the first threshold range so as to be stable is obtained. Then, at the time t24, the write gate (WG) is made off and application of the operation current to the laser diode 32 is stopped. Thereby, write of data is terminated.

The instability time UT2 shown in FIG. 12 is made shorter than the instability time UT1 shown in FIG. 11. In order to be correspondent to the above, the preheat time PT2 shown in FIG. 12 has a value obtained by adjusting the preheat time PT1 shown in FIG. 11. In the example shown in FIG. 12, the preheat time PT2 is made longer than the preheat time PT1. That is, the preheat time PT2 is appropriately adjusted and instability time UT2 is made shorter than the instability time UT1, whereby, in this embodiment, the state where the evaluation index of the signal quality converges to within the first threshold range so as to be stable is obtained at and after the time t23 which is earlier than the time t13. It should be noted that in the example shown in FIG. 12, the optimally adjusted preheat time PT2 is made longer than the preheat time PT1 which is the initial value. However, there is also a case where the optimally adjusted preheat time PT2 is shorter than the preheat time PT1 which is the initial value depending on the characteristics of the laser diode 32.

The time t11 shown in FIG. 11 and time t21 shown in FIG. 12 are the same time. On the other hand, the time t23 shown in FIG. 12 is the time precedent to the time t13 shown in FIG. 11. Accordingly, in this embodiment, it is possible to make the instability time shorter than the comparative example, and stabilize the evaluation index of the signal quality earlier than the comparative example.

It should be noted that in this embodiment described above, the preheat time table is created before the shipment of the magnetic disk device 1 and is used at the time of write of data after the shipment. That is, the preheat time table is made a fixed table. However, the preheat time table may also be a table updatable as the need arises. In this case, for example, at the time of update or the like of the firmware, the preheat time table can be updated. Thereby, it becomes possible to update the preheat time table in accordance with the usage aspect and further improve the reliability of the recording signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   magnetic disks;
   a plurality of magnetic heads each including a read head which reads data from the magnetic disk, a write head which writes data to the magnetic disk, and a heat-assist unit which applies a preheating current of such magnitude that data already written to the magnetic disk is not erased to a near-field optical element for the preheat time to thereby heat-assist the write head in writing data; and
   a control unit which measures the time elapsing from a start of write to the time when a value of an index indicating the quality of a recording signal of data written by the write head converges to within a first threshold range, and adjusts the preheat time for each of the magnetic heads in such a manner that the measured lapse time becomes less than or equal to a second threshold, wherein
   the control unit subdivides the preheat time further into a plurality of fractions for each of the magnetic heads according to at least one of an ambient temperature of the magnetic disk device, a position which is in the radial direction on the magnetic disk, and to which data is written, and a rotational speed of the magnetic disk, and adjusts the subdivided fractions of the preheat time.

2. The magnetic disk device of claim 1, further comprising a preheat time storage unit in which the preheat time is stored for each of the magnetic heads, wherein
the control unit measures the lapse time for each of the magnetic heads, adjusts the preheat time for each of the magnetic heads in such a manner that the measured lapse time becomes less than or equal to the second threshold, and stores the preheat time after the adjustment in the preheat time storage unit.

3. The magnetic disk device of claim 2, wherein
the control unit reads, at the time of write of data to the magnetic disk, the adjusted preheat time stored in the preheat time storage unit for each of the magnetic heads, applies the preheating current to the near-field optical element for the read adjusted preheat time, and writes data to the magnetic disk by the write head of the magnetic head.

4. The magnetic disk device of claim 1, wherein
the index is at least one of On Track BER, Fringe BER, and SNR.

* * * * *